R. C. HARRIS.
TIRE PROTECTOR.
APPLICATION FILED OCT. 25, 1911.
1,038,360.
Patented Sept. 10, 1912.
3 SHEETS—SHEET 1.
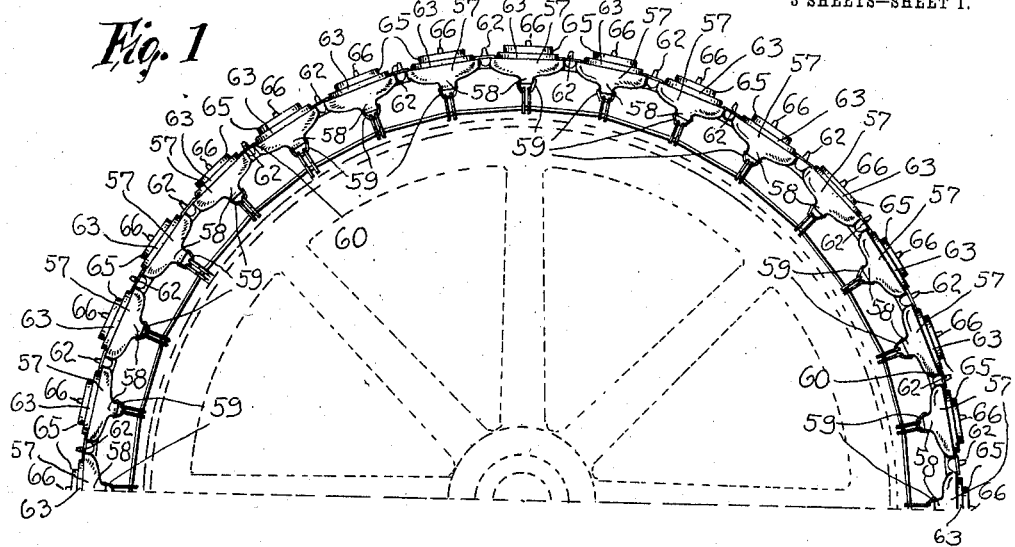
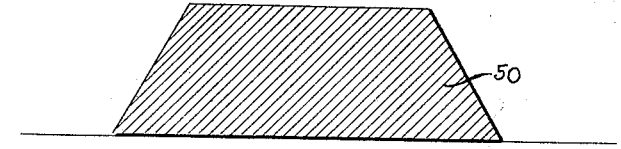
WITNESSES
INVENTOR
Rhoda C. Harris.
his Attorney

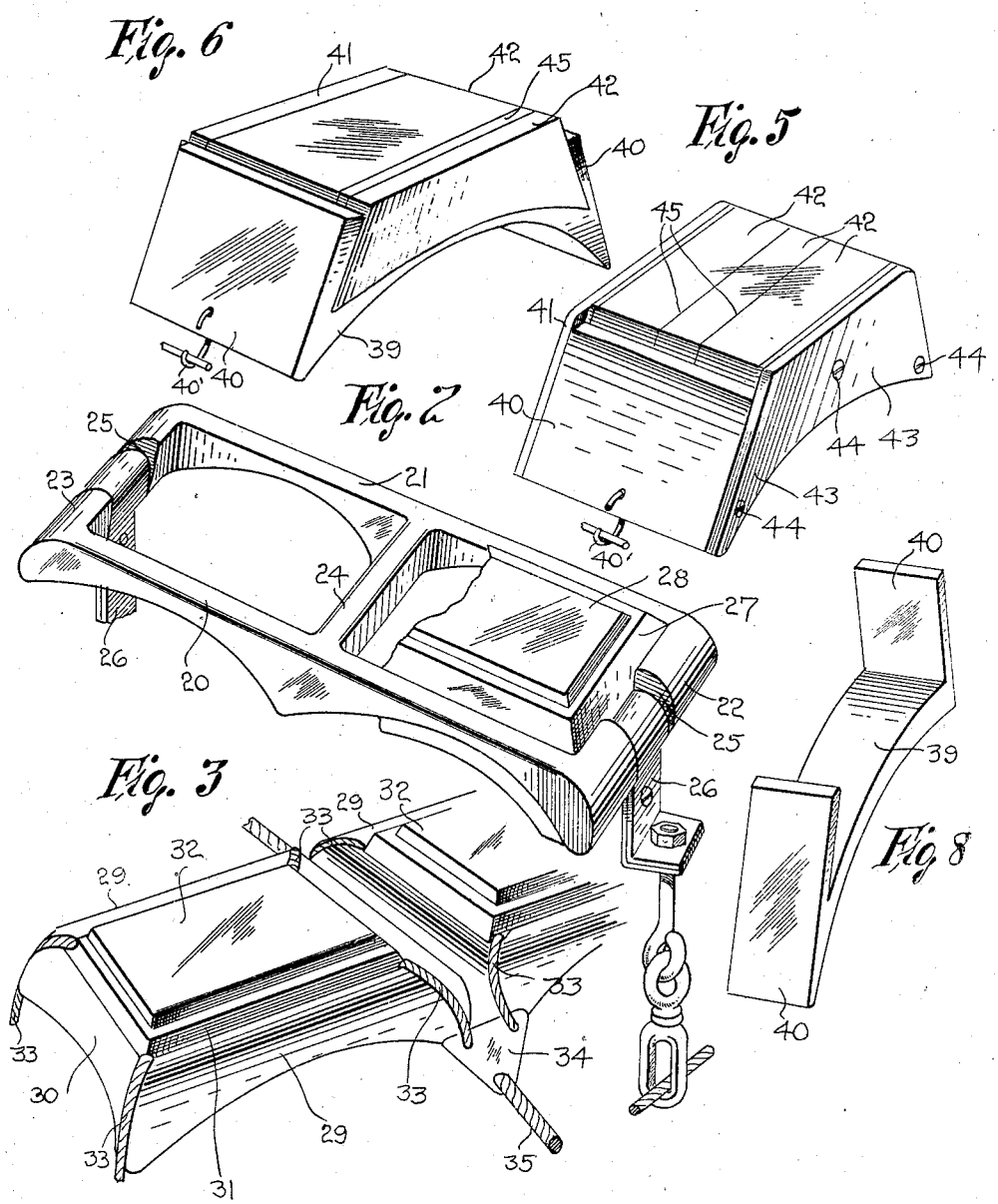

R. C. HARRIS.
TIRE PROTECTOR.
APPLICATION FILED OCT. 25, 1911.
1,038,360.
Patented Sept. 10, 1912.
3 SHEETS—SHEET 3.
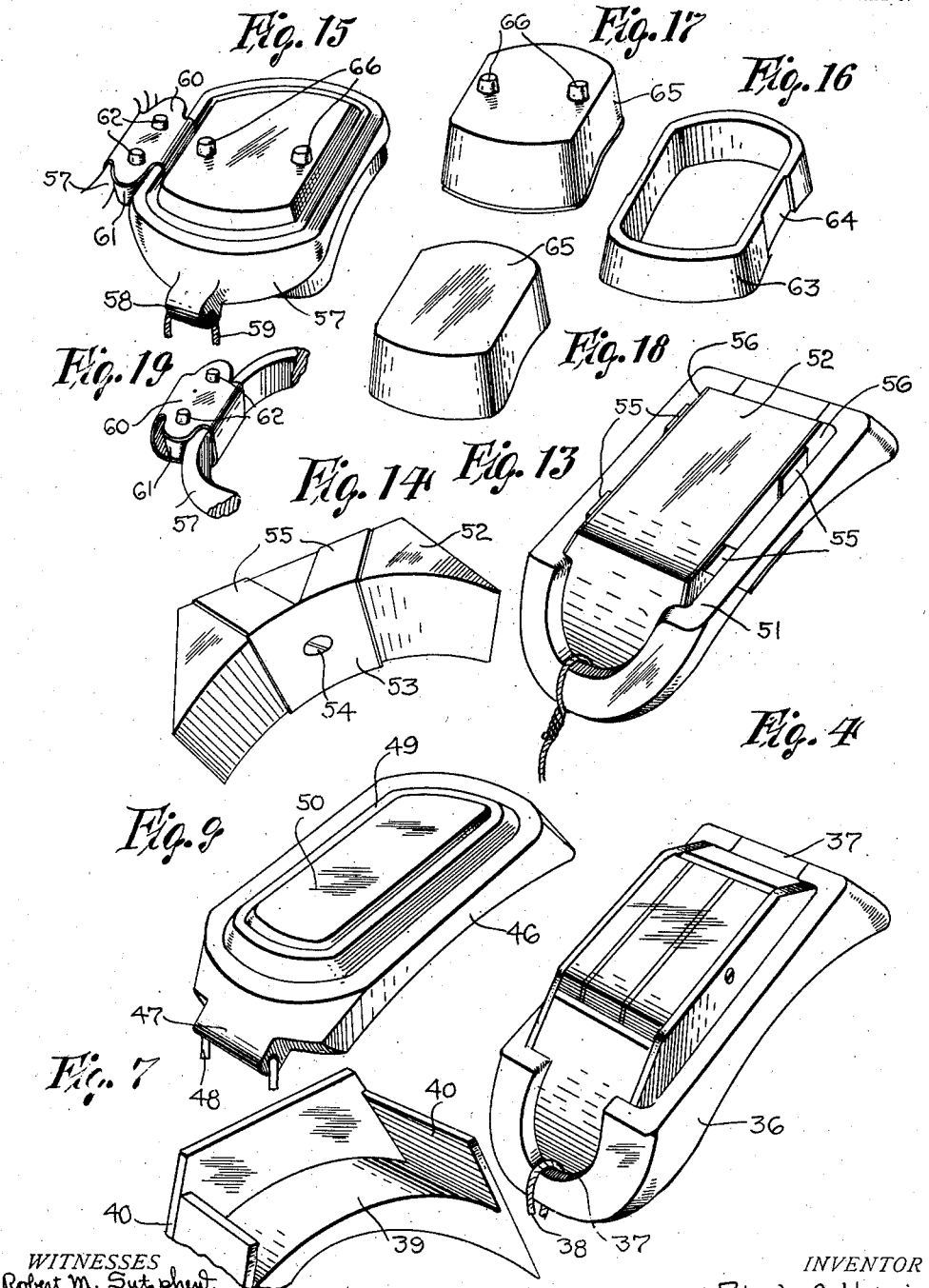
WITNESSES
Robert M. Sutphen.
INVENTOR
Rhoda C. Harris.
By E. E. Vrooman, his Attorney

UNITED STATES PATENT OFFICE.

RHODA C. HARRIS, OF PITTSBURGH, PENNSYLVANIA.

TIRE-PROTECTOR.

1,038,360.  Specification of Letters Patent.  Patented Sept. 10, 1912.

Application filed October 25, 1911. Serial No. 656,738.

*To all whom it may concern:*

Be it known that I, RHODA C. HARRIS, a citizen of the United States, residing at Pittsburgh, in the county of Allegheny and State of Pennsylvania, have invented certain new and useful Improvements in Tire-Protectors, of which the following is a specification, reference being had therein to the accompanying drawing.

This invention relates to tire protectors and the principal object of the same is to provide a protector which has a plurality of sections which are flexibly connected together so that they may conform to the contour of the wheel and to form each section from a number of frames which are carried one within the other, the inner frame carrying the tread blocks and the anti-slipping plates.

By forming the protector as described in the following specification the tread blocks are securely held in place but, at the same time, may be very easily removed when it is desired to repair or renew them.

The invention is illustrated in the accompanying drawings, wherein:

Figure 1 is a side elevation of one portion of a wheel having the improved protector mounted thereon. Fig. 2 is a perspective view of one of the sections, one of the tread blocks being removed from the outer frame. Fig. 3 is a perspective view of a slightly modified type of section. Fig. 4 is a perspective view of still another type of section. Fig. 5 is a perspective view of a modified form of section in which a frame and tread blocks similar to the inner frame and tread blocks shown in Fig. 4 are used without an outer frame. Fig. 6 is a view of the frame and tread blocks shown in Fig. 5, with one of the side bars removed. Fig. 7 is a view of the frame shown in Fig. 6 with the tread blocks removed. Fig. 8 is a perspective view of the frame shown in Fig. 7 with the side bars removed. Fig. 9 is a perspective view of a modified form of section. Fig. 10 is a section through the outer frame of the section shown in Fig. 9. Fig. 11 is a section through the inner frame shown in Fig. 9. Fig. 12 is a section through the tread block used in the type shown in Fig. 9. Fig. 13 is a perspective view of a type of section which is somewhat similar to that shown in Fig. 4. Fig. 14 is a view of the tread block and inner frame used in Fig. 13. Fig. 15 is a perspective view of still another type of section. Fig. 16 is a perspective view of the inner frame used in the type shown in Fig. 15. Fig. 17 is a perspective view of the tread block used in Fig. 15. Fig. 18 is a perspective view of a tread block similar to that shown in Fig. 17 with the anti-slipping devices removed. Fig. 19 is a fragmentary view of the outer frame used in Fig. 15.

Referring to the accompanying drawings by numerals it will be seen that the invention comprises a number of forms of sections which are held together and secured to the tire so that the tread of the tire will not touch the ground but will be inclosed by the sections thus doing away with any danger of puncturing the tire.

In Fig. 2 I have shown one type of section which may be used and which comprises side bars 20 and 21 which are connected by the end bars 22 and 23, and also by the intermediate bar 24, the side bars 20 and 21 being carried down to the bottom of the cross bar 24 to strengthen the cross bar. The end bars 22 and 23 are each provided with a centrally located seat 25 in which a link 26 is mounted so that the protector can be connected with the wheel. This type of section is intended to be used with wheels in which the tire is formed of two sections, thus necessitating two rows of tread blocks. The cross bar 24 divides the outer frame into two sections and the inner frame 27 is mounted in each of the sections and carries a tread block 28. The two frames and the tread block converge toward their outer faces so that the inner frames and tread blocks will be held in place when the protector is upon the wheel without necessitating any other securing means.

In Fig. 3 I have shown a slightly modified form of protector from that shown in Fig. 2 in which there are provided two separate sections instead of one section provided with cross bar 24. The side bars 29 and end bars 30 are constructed similar to the ones shown in Fig. 2 and the inner frame 31 and tread block 32 are also similar to those shown in Fig. 2.

It should be noted however that the inner frame and tread blocks extend the full length of the outer frame and the outer frames are connected together by the links 33 and plates 34, the plates 34 being connected by a flexible fastening 35 which holds the sections together and assists in holding the protector upon the wheel.

In Figs. 4 through 8, I have shown a slightly modified type of section in which the outer frame 36 has its end walls provided with recesses 37 in which the securing links 38 are mounted. The inner frame which is used with this type of section comprises a curved base 39 and converging end walls 40. The side walls 41 are secured to the base and the end walls and the tread blocks 42 are positioned in the inner frame and rest upon the base between the end walls. The tread blocks and end walls converge toward the outer face of the protector so that when the second side wall 43 is secured to the base and end walls by means of the screws 44, the tread blocks will be securely held in place. Antislipping plates 45 are placed between the tread blocks so that the wheels will be prevented from skidding and also to prevent the tread blocks from being worn too fast. If desired the outer frame may be omitted and the inner frame provided with blocks 40' with which the securing cable is connected.

In Figs. 9 through 12, I have shown a type or section in which the outer frame 45 is very similar to the frame shown in Fig. 4 with the exception of the projection 47 which is formed at each end so that the attaching link 48 may be connected with the frame. The inner frame 49 is similar to the inner frame shown in Fig. 3 and the tread block 50 is also similar to the block used in Fig. 3, the inner frame being the full length of the opening formed in the outer frame and the tread block being a solid piece.

In Figs. 13 and 14 the outer frame 51 is exactly similar to the one shown in Fig. 4 and the tread block 52 is similar to the one shown in Fig. 9. The inner frame comprises a plate 53 which is secured to the inner face of the tread block by means of the screw 54 and has diverging arms 55 extending from each end which extend up the side faces of the tread block. These arms 55 hold the anti-slipping plates 56 to the side faces of the tread block so that there is no danger of them slipping out of place.

In Figs. 15 through 19 I have shown a modification in which the outer frames 57 are provided with end ears 58 to which the links 59 are connected. The frames 57 are connected by links 60 and are held in place by the spacing block 61, the spacing block 61 being held in the links by means of rivets 62. The inner frames 63 have their side walls provided with the recesses 64 so that the links 60 can not be worn. The tread blocks 65 may be formed either from plain blocks of material as shown in Fig. 18 or, if desired, may be provided with the anti-slipping rivets 66.

When using the device the sections are connected together and placed around the wheel and the end sections are connected together by any suitable means so that the string of sections will be securely held upon the wheel.

What I claim is:

1. A tire protector comprising a plurality of sections each comprising an outer frame, an inner frame having a curved base, end walls extending from said base, side walls secured to said base and end walls, tread blocks carried by said inner frame, and means connecting said sections together.

2. A protector comprising a plurality of sections, each comprising an outer frame, an inner frame mounted in said outer frame, said inner frame comprising a curved base, converging end walls carried by said base, side walls removably secured to said base and end walls, and tread blocks in said inner frames.

In testimony whereof I hereunto affix my signature in presence of two witnesses.

RHODA C. HARRIS.

Witnesses:
 ERNEST N. BRADSHAW
 JOHN D. HARLEY.